United States Patent
Schuh et al.

(10) Patent No.: US 12,301,076 B2
(45) Date of Patent: May 13, 2025

(54) METHOD FOR SINTERING A MULTICOMPONENT OBJECT TO BE SINTERED, ELECTRIC MACHINE, AND ELECTRIC VEHICLE

(71) Applicant: Siemens Aktiengesellschaft, Munich (DE)

(72) Inventors: Carsten Schuh, Baldham (DE); Thomas Soller, Bayern (DE); Rolf Vollmer, Gersfeld (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 640 days.

(21) Appl. No.: 17/280,437

(22) PCT Filed: Sep. 6, 2019

(86) PCT No.: PCT/EP2019/073799
§ 371 (c)(1),
(2) Date: Mar. 26, 2021

(87) PCT Pub. No.: WO2020/064299
PCT Pub. Date: Apr. 2, 2020

(65) Prior Publication Data
US 2021/0379656 A1    Dec. 9, 2021

(30) Foreign Application Priority Data
Sep. 27, 2018    (EP) ..................... 18197125

(51) Int. Cl.
*B22F 7/06*    (2006.01)
*B22F 5/08*    (2006.01)
(Continued)

(52) U.S. Cl.
CPC ............... *H02K 15/02* (2013.01); *B22F 5/08* (2013.01); *B22F 7/062* (2013.01); *B33Y 10/00* (2014.12); *B33Y 40/00* (2014.12); *B33Y 80/00* (2014.12)

(58) Field of Classification Search
CPC ........ B22F 2005/005; B22F 3/10; B22F 5/08; B22F 7/062; B33Y 10/00; B33Y 40/00;
(Continued)

(56) References Cited

U.S. PATENT DOCUMENTS

| | | | |
|---|---|---|---|
| 6,027,626 A | 2/2000 | Kurosawa | 204/501 |
| 2003/0192169 A1 | 10/2003 | Frederick, Jr. et al. | 29/607 |

(Continued)

FOREIGN PATENT DOCUMENTS

| | | | |
|---|---|---|---|
| CN | 101636364 A | 1/2010 | ........... C04B 35/486 |
| CN | 101670439 A | 3/2010 | ............ B21B 27/02 |

(Continued)

OTHER PUBLICATIONS

Selecting Brazing Fixture Materials.*
(Continued)

*Primary Examiner* — Jenny R Wu
(74) *Attorney, Agent, or Firm* — Slayden Grubert Beard PLLC

(57) ABSTRACT

Various embodiments include a method for sintering a multicomponent sinter product comprising: forming a first component consisting of a first material printed with one or more recesses for a second component; forming the second component consisting of a second material; inserting at least a portion of the second component into the one or more recesses of the first component; and shrinking the first component and the second component onto one another by sintering.

11 Claims, 3 Drawing Sheets

(51) Int. Cl.
    *B22F 10/10*   (2021.01)
    *B33Y 10/00*   (2015.01)
    *B33Y 40/00*   (2020.01)
    *B33Y 80/00*   (2015.01)
    *H02K 15/02*   (2006.01)

(58) Field of Classification Search
    CPC ......... B33Y 80/00; H02K 15/02; Y02P 10/25;
                                                     Y02T 10/64
    See application file for complete search history.

(56) References Cited

U.S. PATENT DOCUMENTS

| | | | |
|---|---|---|---|
| 2010/0062396 A1 | 3/2010 | Hock et al. | 433/201.1 |
| 2012/0037104 A1 | 2/2012 | Pohl et al. | 123/90.15 |
| 2013/0259732 A1 | 10/2013 | Schult et al. | 419/6 |
| 2016/0061201 A1 | 3/2016 | Frank et al. | 417/410.4 |
| 2016/0226323 A1 | 8/2016 | Piascik et al. | 310/216.065 |
| 2017/0063183 A1 | 3/2017 | Shrestha | H02K 1/22 |
| 2018/0184550 A1* | 6/2018 | Jenkins | B33Y 80/00 |
| 2018/0205298 A1 | 7/2018 | Nishidate | H02K 11/21 |
| 2019/0020232 A1 | 1/2019 | Büttner | H02K 1/22 |
| 2019/0198206 A1* | 6/2019 | Ter Maat | H01F 1/015 |

FOREIGN PATENT DOCUMENTS

| | | | | |
|---|---|---|---|---|
| CN | 102371355 A | | 3/2012 | B22F 7/08 |
| CN | 105143674 A | | 12/2015 | F04C 15/00 |
| CN | 107473725 A | | 12/2017 | B32B 1/00 |
| DE | 23 37 141 | | 4/1975 | C04B 37/00 |
| DE | 10 2017 208094 | | 7/2018 | B22F 3/10 |
| EP | 3 112 057 | | 1/2017 | B22F 3/105 |
| EP | 3 193 431 | | 7/2017 | H02K 1/24 |
| FR | 3 036 300 | | 11/2016 | B22F 5/00 |
| FR | 3036300 A1 | * | 11/2016 | |
| JP | 10190057 A | * | 7/1998 | |
| JP | 10195507 A | | 7/1998 | |
| JP | 2006009091 A | | 1/2006 | B22F 7/08 |

OTHER PUBLICATIONS

Jiang, Jiuchun, et al, "Introduction to an Electric Vehicle," Beijing Jiaotong University Press ISBN 978-7-5121-3139-2, 6 pages (Chinese w/ English translation), Mar. 1, 2017.

Chinese Office Action, Application No. 201980062626.6, 10 pages, Apr. 4, 2023.

Search Report for International Application No. PCT/EP2019/073799, 14 pages, Dec. 5, 2019.

Search Report for EP Application No. 18197125.0, 10 pages, Apr. 8, 2019.

"ISO/ASTM 52900:2015(E) Additive manufacturing—General principles—Terminology", ISO/ASTM Standard, ISO/ASTM 52900:2015, XP009526197, URL:https://www.iso.org/standard/69669.html, 26 pages, Dec. 12, 2015.

European Office Action, Application No. 19778798.9, 12 pages, Jan. 27, 2023.

European Office Action, Application No. 19778798.9, 8 pages, Sep. 6, 2023.

Shen, Xiaoping, "Powder Metallurgical Manufacturing Technology" National Defense Industry Publisher, pp. 118-119, Jun. 30, 2015.

Chinese Office Action, Application No. 201980062626.6, 10 pages, Jun. 30, 2022.

* cited by examiner

METHOD FOR SINTERING A MULTICOMPONENT OBJECT TO BE SINTERED, ELECTRIC MACHINE, AND ELECTRIC VEHICLE

CROSS-REFERENCE TO RELATED APPLICATIONS

This application is a U.S. National Stage Application of International Application No. PCT/EP2019/073799 filed Sep. 6, 2019, which designates the United States of America, and claims priority to EP Application No. 18197125.0 filed Sep. 27, 2018, the contents of which are hereby incorporated by reference in their entirety.

TECHNICAL FIELD

The present disclosure relates electric vehicles. Various embodiments include methods for sintering a multicomponent sinter product, electric machines, and/or electric vehicles.

BACKGROUND

Some methods for producing magnetic metal sheets for electric machines use screen printing. In these methods, starting from metal powder, first a printing paste is created, which is then processed by means of a screen-printing technique to form a green body in the form of a thick film. Subsequently, this green body is converted into a metallic, structured metal sheet in the form of a magnetic metal sheet by way of thermal treatment, i.e. by means of debinding and sintering.

Some such methods may be used to form multicomponent magnetic metal sheets in this manner. To this end, the various components of a magnetic metal sheet are printed onto a support plate one after another in succession, after which they are thermally treated together. However, not all materials can be used for sintering in this manner. In particular, the sintering of sinter product that is distortion-free and dense can occasionally only be realized with difficulty in this manner.

SUMMARY

The teachings of the present disclosure include methods for sintering a multicomponent sinter product that overcomes the disadvantages mentioned in the introduction, electric machines, and electric vehicles. For example, some embodiments of the teachings herein include a method for sintering a multicomponent sinter product (10), in which a first component formed by a first material (20) is printed with one or more recesses for a second component (50), a second component (50) formed by a second material is inserted into the recess or recesses in the first component, and first and second component (50) are shrunk onto one another by means of sintering.

In some embodiments, the sinter product (10) forms a layer, in particular a metal sheet and/or a magnetic metal sheet, ideally a rotor sheet or a stator sheet.

In some embodiments, the first component is printed with at least one such recess that surrounds or borders the second component (50).

In some embodiments, the first component is formed with at least one toothed and/or stepped recess.

In some embodiments, a first component is used with a sinter shrinkage that is more pronounced compared to the second component (50).

In some embodiments, the second component (50) is printed before the first and second component are sintered.

In some embodiments, the second component is punched or cut, in particular from a metal sheet and/or by means of a laser, before the first and second component (50) are sintered together.

In some embodiments, the first component is non-magnetic.

In some embodiments, the second component (50) is magnetically soft and/or electrically conductive and/or permanently magnetic.

In some embodiments, the sinter product is a layer, e.g. a magnetic metal sheet.

In some embodiments, sintering takes place by means of a sintering tool which has a sinter product area for fitting the sinter product (10) and in which the sinter product area is made to vibrate during sintering, for example by means of acoustic surface waves.

As another example, some embodiments include an electric machine, having a rotor, formed from rotor sheets (10) manufactured in accordance with a method as described herein.

As another example, some embodiments include an electric vehicle, in particular a hybrid electric aircraft, with an electric machine (710) as described herein.

BRIEF DESCRIPTION OF THE DRAWINGS

The teachings herein are explained in more detail below with reference to exemplary embodiments illustrated in the drawings, in which.

DETAILED DESCRIPTION

Figure 1:
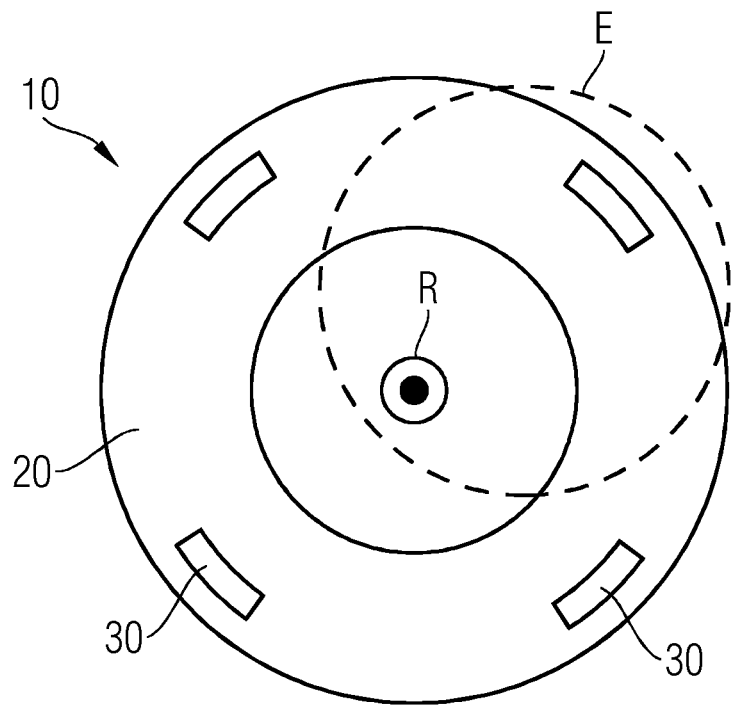
FIG. 1 shows a schematic top view of a magnetic metal sheet manufactured with a method incorporating teachings of the present disclosure and comprising a first and a second component.

Some embodiments of the teachings herein include methods for sintering a multicomponent sinter product, a first component formed by a first material is printed with at least one recess, i.e. with one or more recesses, for a second component, and a second component formed by a second material is inserted into the recess or recesses in the first component, and first and second component are shrunk onto one another by means of sintering. In this context, shrinking means that a fixed connection of first and second component is achieved due to different sintering shrinkage with corresponding geometry of the first and second component.

In some embodiments, materials with considerably different sintering shrinkages can be sintered to one another to form a distortion-free and dense sinter product with high mechanical strength, particularly at boundaries between the first component and second component.

In some embodiments, it is possible for materials that are difficult to sinter or can only be obtained in powder form with difficulty to form components in multicomponent sinter products. In particular, magnetic materials that are difficult to sinter can be easily sintered to form a multicomponent sinter product by means of the teachings herein.

In some embodiments, by means of sintering the first and second component together, it is possible to separate process steps during the manufacturing and perform them in parallel, so that the degree of utilization of the machines used is increased considerably.

In some embodiments, the sinter product forms a layer, in particular a magnetic metal sheet, e.g., the magnetic metal sheet is a rotor sheet or a stator sheet.

In some embodiments, it is possible in particular to manufacture magnetic metal sheets which form a rotor sheet and/or a stator sheet and which are structured in a radial direction and, particularly in a radial direction, have a sequence of first and second component. Expediently, it is possible to manufacture magnetic metal sheets that comprise ready-made laminates and/or fiber composite materials.

In some embodiments, the second component is a punched component and/or a presintered structure. Expediently, flux-guiding regions of magnetic metal sheets for example may be formed by means of the second component.

In some embodiments, the first component is printed with at least one such recess that surrounds or borders the second component.

In some embodiments, the first component is formed with at least one toothed and/or stepped recess. In this manner, the connection between the first component and the second component can be additionally improved by way of a positive fit due to the at least one toothed and/or stepped recess.

In some embodiments, a first component is used with a sinter shrinkage that is more pronounced compared to the second component. In this manner, during sintering, the first component shrinks around the second component that is inserted into recesses in the first component.

In some embodiments, the second component is printed before the first and second component are sintered. In this manner, it is also possible to manufacture geometries of the first and second component that are conventionally difficult to realize.

In some embodiments, the second component is punched or cut, in particular from a metal sheet and/or by means of a laser, before the first and second component are sintered together. In this manner, punched parts can be manufactured as second components and processed to form a multicomponent sinter product in a simple manner.

In some embodiments, the first component may be non-magnetic.

In some embodiments, the second component is suitably magnetically soft and/or electrically conductive and/or permanently magnetic. In this manner, magnetically flux-guiding or field-generating constituent parts of a magnetic metal sheet can be manufactured.

In some embodiments, first and second component are pressed together and/or laminated, e.g. in a uniaxial or isostatic manner. In this manner, a further improved connection of first and second component can be achieved and the positive and/or non-positive fit between first and second component can be increased.

In some embodiments, the sinter product is a layer, e.g. a magnetic metal sheet, for example a rotor and/or stator sheet.

In some embodiments, sintering takes place by means of a sintering tool that has a sinter product area for fitting the sinter product, wherein in the method the sinter product area is made to vibrate during sintering, for example by means of acoustic surface waves. In this development of the invention, the sinter product is easily prevented from sticking to the sinter product area in a positive and/or non-positive manner by means of the vibration.

In some embodiments, an electric machine has a rotor, formed of rotor sheets, and/or a stator, formed of stator sheets, which are manufactured by means of a method incorporating teachings of the present disclosure as described in the foregoing. In some embodiments, an electric vehicle is a hybrid electric aircraft and has such an electric machine.

The magnetic metal sheet 10 that is manufactured using methods as described herein and shown in FIG. 1 is a magnetic metal sheet 10 for forming a rotor of an electrical machine in the form of an electric motor. The magnetic metal sheet 10 is substantially, i.e. unless otherwise described in the following, embodied as a circular-cylindrical disk which, at least unless otherwise described in the following, is formed with a magnetically non-flux-guiding material 20. The magnetic metal sheet is provided and embodied for rotating the rotor about an axis of rotation R, i.e. the center point of the circular outer contour of the magnetic metal sheet 10 lies at the axis of rotation R.

The magnetic metal sheet 40 has leadthroughs 30 distributed around the perimeter that extend along a section in the peripheral direction, which is longer than the size of the recess in the radial direction, three times as long in the exemplary embodiment shown. The leadthroughs 30 of the magnetic metal sheet 10 serve to accommodate permanent magnets or coils for operation of the rotor of the electric motor.

Figure 2:
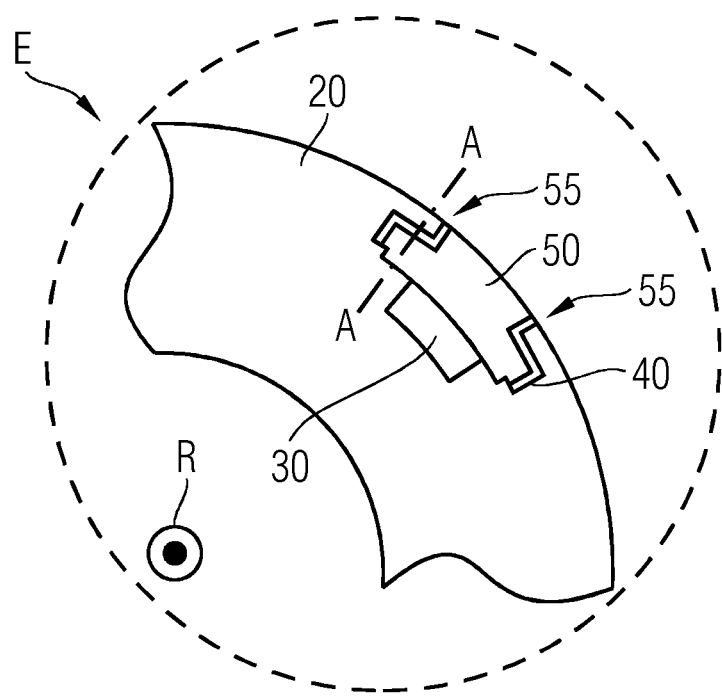
FIG. 2 shows a schematic top view of a detail of the magnetic metal sheet manufactured in accordance with FIG. 1.

The magnetic metal sheet 10, as shown in the detail E in FIG. 2, at the peripheral locations of the leadthroughs 30, but lying radially to the outside of said leadthroughs 30, has a region 50 of flux-guiding metal in each case, which extends from the leadthroughs 30 up to the radial edge of the magnetic metal sheet 10.

The region 50 is framed by the non-flux-guiding material 20 in such a manner that the region 50, lying radially to the outside of the leadthroughs 30, does not assume the shape of a circular sector for example, but rather instead the non-flux-guiding material 20 in each case protrudes at the radially outer edge of the magnetic metal sheet 10 with two protrusions 55 that point towards one another in the peripheral direction around the region 50. In this context, the protrusions 55 do not meet at the perimeter, but rather leave a clearance for the region 50 at the perimeter, so that a region 50 of the magnetic metal sheet 10 that extends from the leadthroughs 30 up to the radial edge of the magnetic metal sheet 10 remains free of non-flux-guiding material 20. In this manner, the efficiency of the rotor embodied in this way is not impaired. As a result of the projections 55, the non-flux-guiding material 20 encloses the region 50.

Figure 3:
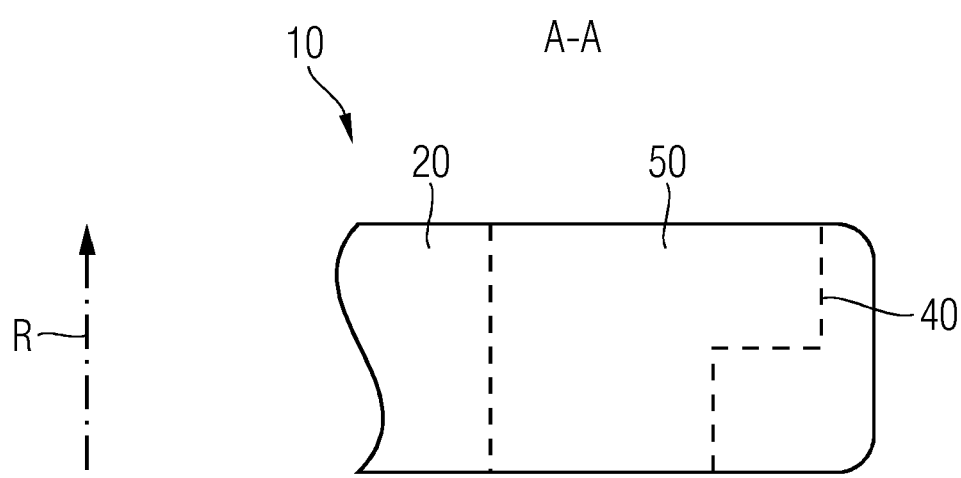
FIG. 3 shows a schematic representation of a longitudinal section of the detail in accordance with FIG. 2 of the magnetic metal sheet in accordance with FIG. 1.

Furthermore, the regions 50 are embodied with a profile that is stepped in the axial direction R at their edge regions, which do not border the leadthroughs 30 or do not directly border the radial edge of the magnetic metal sheet 10. As shown in FIG. 3 along a section of the rotor in accordance with FIG. 2, the edge 40 of the regions 50 runs along a first axial section of the magnetic metal sheet 10 in the axial direction R and at a second axial section of the magnetic metal sheet 10 following the first section, likewise in the axial direction R, however the edge 40 in the second axial section is offset in relation to the edge 40 in the first axial section in a direction perpendicular to the extension directions of the edge 40 in the first axial section. Due to this stepped edge 40 between the non-flux-guiding material 20 and region 50, non-flux-guiding material 20 and region 50 are also interlocked with one another in the axial direction R due to the protrusions 55 in addition to the peripheral bracing.

Figure 4:
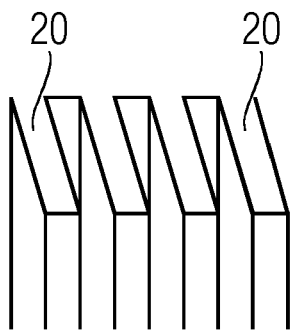
FIG. 4 shows a schematic perspective representation of an edge of a recess in the first component of the magnetic metal sheet in accordance with FIGS. 1 to 3.
Figure 5:
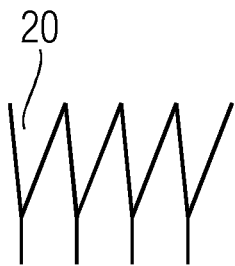
FIG. 5 shows a schematic perspective representation of a further embodiment of an edge of a recess in the first component of the magnetic metal sheet in accordance with FIGS. 1 to 3.
Figure 6:
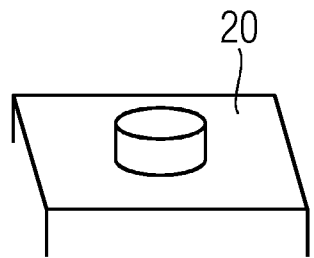
FIG. 6 shows a schematic perspective representation of a further embodiment of an edge of a recess in the first component of the magnetic metal sheet in accordance with FIGS. 1 to 3.

In some embodiments, as shown in FIGS. 4, 5 and 6, the edge 40 may run in a toothed (FIG. 4) or comb-like (FIG. 5) or interlocking brick-like (FIG. 6) manner in a plane perpendicular to the axial direction R. In some embodiments, the edge may also be embodied in a corrugated manner. In these further exemplary embodiments in accordance with FIGS. 4 to 6, non-flux-guiding material 20 and the regions 50 are braced against one another or interlocked and therefore connected to one another with a positive fit. In some embodiments, the edge 40 may also be crimped or provided with a flat area, for example for accommodating a protrusion or collar corresponding to such a flat area.

In some embodiments, the magnetic metal sheet shown in FIG. 1 may be manufactured as follows:

First, the regions are printed from the non-flux-guiding material 20, which form a first continuous component made of the non-flux-guiding material 20. Subsequently, the first component is dried. In this context, recesses are provided on the first component which will form the regions 50 with the flux-guiding material once the regions 50 have been filled with the flux-guiding material.

The first component is debound and presintered. In some embodiments, it is possible to dispense with this second step of debinding and presintering the first component.

In a third method step, as a further component, further regions 50 are printed with the flux-guiding material. The printing of the further regions 50 with the flux-guiding material, in a further exemplary embodiment not shown separately that otherwise corresponds to the previously described exemplary embodiment, may also take place in parallel with the printing of the first component with the non-flux-guiding material 20. The third method step therefore does not necessarily have to be performed after the first method step in time, but rather in principle may also take place in parallel with the first method step in time.

The printing of the further components with the regions 50 of flux-guiding material takes place spatially separately from the first component with the non-flux-guiding material 20 in the exemplary embodiment described here. In some embodiments, the further regions 50 may be printed directly into the recesses in the first component.

In a fourth method step, the further components are debound and presintered. In some embodiments, it is possible to dispense with this fourth step of debinding and presintering the further components.

In a final method step, the first component made of the non-flux-guiding material 20 and the further regions 50 of flux-guiding material are sintered together. In this context, the sinter shrinkage of the first component made of non-flux-guiding material 20 is greater than the sinter shrinkage of the further regions 50 of flux-guiding material. The first component made of non-flux-guiding material 20 therefore shrinks onto the further regions 50 of flux-guiding material.

In the previously described exemplary embodiments, the further regions 50 of flux-guiding material do not necessarily have to be present as sintered parts. In some embodiments, the further regions 50 of flux-guiding material may be present as punched parts, which are inserted into the recesses in the first component. In these exemplary embodiments, the first component made of non-flux-guiding material 20 can also be shrunk around the punched parts by means of sintering.

Figure 7:
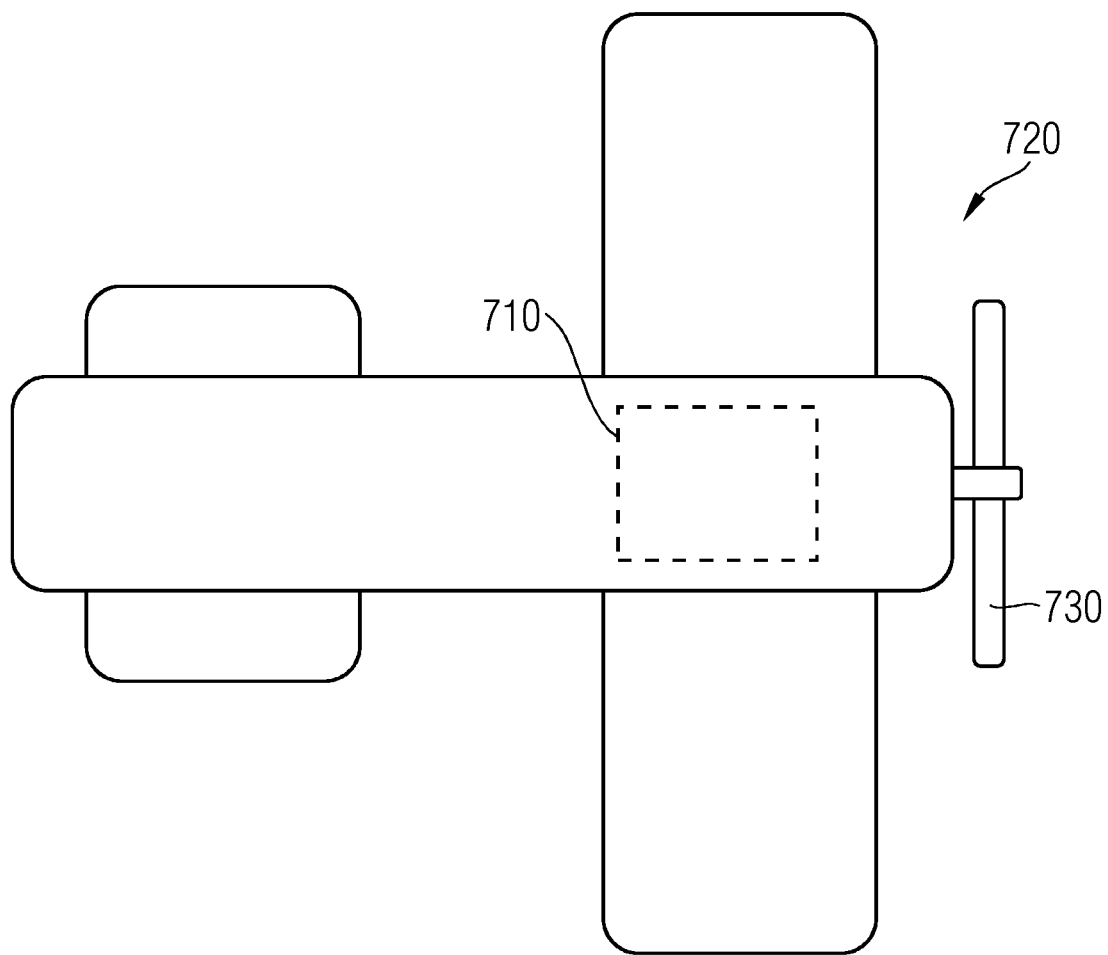
FIG. 7 shows a schematic sketch of a hybrid electric aircraft incorporating teachings of the present disclosure with an electric motor incorporating teachings of the present disclosure with magnetic metal sheets in accordance with FIGS. 1 to 3.

As shown in FIG. 7, the magnetic metal sheets 10 form a rotor of an electric machine 710 of a hybrid electric aircraft 720. In some embodiments, the magnetic metal sheets 10 may also form a stator of the electric machine 710. The electric machine 710 forms an electric motor of the hybrid electric aircraft 720 and is connected to a propeller 730 of the hybrid electric vehicle 720 to form the drive thereof.

What is claimed is:

1. A method for sintering a multicomponent sinter product, the method comprising:
    printing a first component consisting of a first material having a first rate of shrinkage during sintering, the first component including one or more recesses disposed around a radial edge of the first component;
    forming a second component consisting of a second material having a second rate of shrinkage during sintering, wherein forming the second component includes a separate process from printing the first component;
    wherein the first rate of shrinkage during sintering is different from the second rate of shrinkage during sintering;
    inserting at least a portion of the second component into the one or more recesses of the first component; and
    shrinking the first component and the second component onto one another by sintering;
    wherein the one or more recesses each include a respective edge region having a step in a radial direction as defined by the radial edge.

2. The method as claimed in claim 1, wherein the multicomponent sinter product comprises a metal sheet.

3. The method as claimed in claim 2, wherein the first component is printed with at least one recess that surrounds or borders an entirety of the second component.

4. The method as claimed in claim 3, wherein the first component includes at least one toothed recess.

5. The method as claimed in claim 1, wherein the shrinkage rate during sintering of the first material is greater than the shrinkage rate during sintering of the second material.

6. The method as claimed in claim 1, wherein forming the second component includes printing the second component.

7. The method as claimed in claim 1, wherein forming the second component includes punching the second component from a sheet, or cutting the second component from a sheet.

8. The method as claimed in claim 1, wherein the first component is non-magnetic.

9. The method as claimed in claim 1, wherein the second component is magnetic and/or electrically conductive and/or permanently magnetic.

10. The method as claimed in claim 1, in which the sinter product comprises a magnetic metal sheet.

11. The method as claimed in claim 1, wherein:
the sintering uses a sintering tool with a sinter product area for fitting the sinter product; and
the sinter product area is made to vibrate during sintering.

\* \* \* \* \*